(12) United States Patent
Lee

(10) Patent No.: US 12,349,031 B2
(45) Date of Patent: Jul. 1, 2025

(54) AUDIO DATA RECEPTION METHOD USING SHORT-RANGE WIRELESS COMMUNICATION IN WIRELESS COMMUNICATION SYSTEM, AND APPARATUS THEREFOR

(71) Applicant: LG ELECTRONICS INC., Seoul (KR)

(72) Inventor: Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 17/798,867

(22) PCT Filed: Feb. 9, 2021

(86) PCT No.: PCT/KR2021/001714
§ 371 (c)(1),
(2) Date: Aug. 10, 2022

(87) PCT Pub. No.: WO2021/162413
PCT Pub. Date: Aug. 19, 2021

(65) Prior Publication Data
US 2023/0103916 A1 Apr. 6, 2023

(30) Foreign Application Priority Data
Feb. 10, 2020 (KR) .................. 10-2020-0015867

(51) Int. Cl.
*H04W 4/80* (2018.01)
*G10L 19/24* (2013.01)
(52) U.S. Cl.
CPC ............... *H04W 4/80* (2018.02); *G10L 19/24* (2013.01)
(58) Field of Classification Search
CPC .................................. H04W 4/80; G10L 19/24
(Continued)

(56) References Cited

U.S. PATENT DOCUMENTS 10,462,203 B2 * 10/2019 Good .................. H04N 21/266
2011/0138018 A1 6/2011 Raveendran et al.
(Continued)

FOREIGN PATENT DOCUMENTS

BR 102013033429 A2 * 7/2015 ............. G06Q 50/10
CA 2982846 A1 * 4/2018 ......... H04L 65/4069
(Continued)

OTHER PUBLICATIONS

PCT International Application No. PCT/KR2021/001714, International Search Report dated May 24, 2021, 5 pages.

*Primary Examiner* — Mong-Thuy T Tran
(74) *Attorney, Agent, or Firm* — LEE, HONG, DEGERMAN, KANG & WAIMEY

(57) ABSTRACT

According to the present disclosure, the method for receiving the audio data by the first device, comprises: transmitting, to a third device, a notification message requesting a change of a configuration related to audio data streaming of the first device, wherein the notification message includes configuration change information for changing the configuration related to the audio data streaming; performing, with the third device, a configuration change procedure for changing the configuration related to the audio data streaming, on the basis of the notification message; and receiving, from the third device, audio data related to the audio data streaming, on the basis of the changed configuration related to the audio data streaming, wherein the configuration change procedure is initiated on the basis of the notification message, and the configuration related to the audio data streaming is changed on the basis of the configuration change information.

15 Claims, 9 Drawing Sheets

(58) Field of Classification Search
USPC .......................................................... 455/41.2
See application file for complete search history.

(56) References Cited

U.S. PATENT DOCUMENTS

| | | | | |
|---|---|---|---|---|
| 2020/0137542 | A1* | 4/2020 | Jung | ................ H04W 4/80 |
| 2021/0400096 | A1* | 12/2021 | Lee | ............ H04L 65/1094 |
| 2022/0263883 | A1* | 8/2022 | Lee | ................ G10L 19/00 |
| 2022/0312116 | A1* | 9/2022 | Lee | ................ H04R 1/403 |
| 2022/0346040 | A1* | 10/2022 | Lee | ............... H04L 12/189 |

FOREIGN PATENT DOCUMENTS

| | | |
|---|---|---|
| JP | 2006195144 | 7/2006 |
| JP | 2019062289 | 4/2019 |
| KR | 100606060 | 7/2006 |
| KR | 20100054422 | 5/2010 |
| KR | 101581947 | 12/2015 |

* cited by examiner

[FIG. 1]
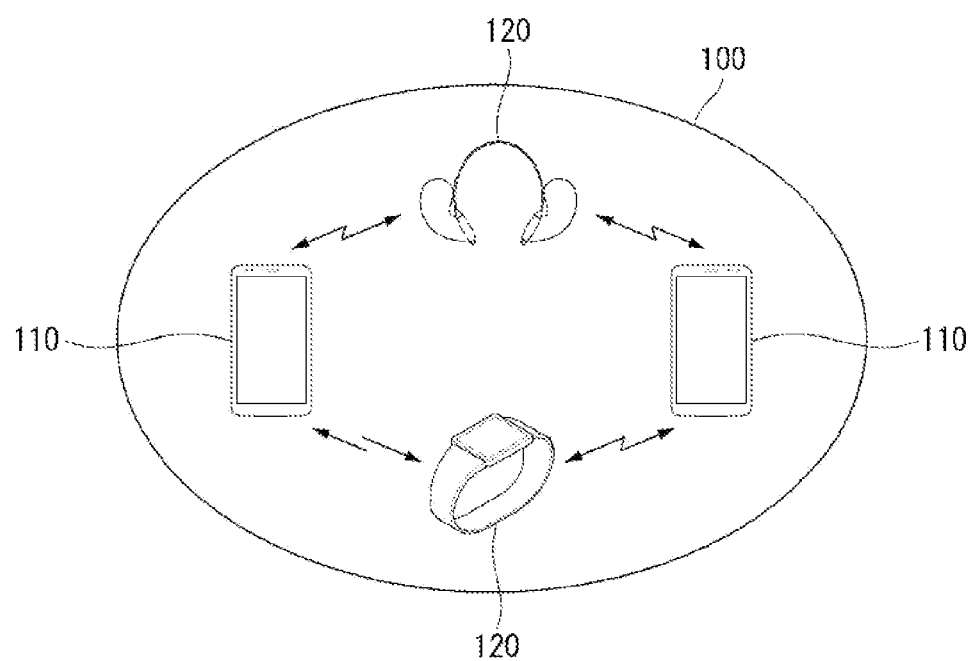

[FIG. 2]
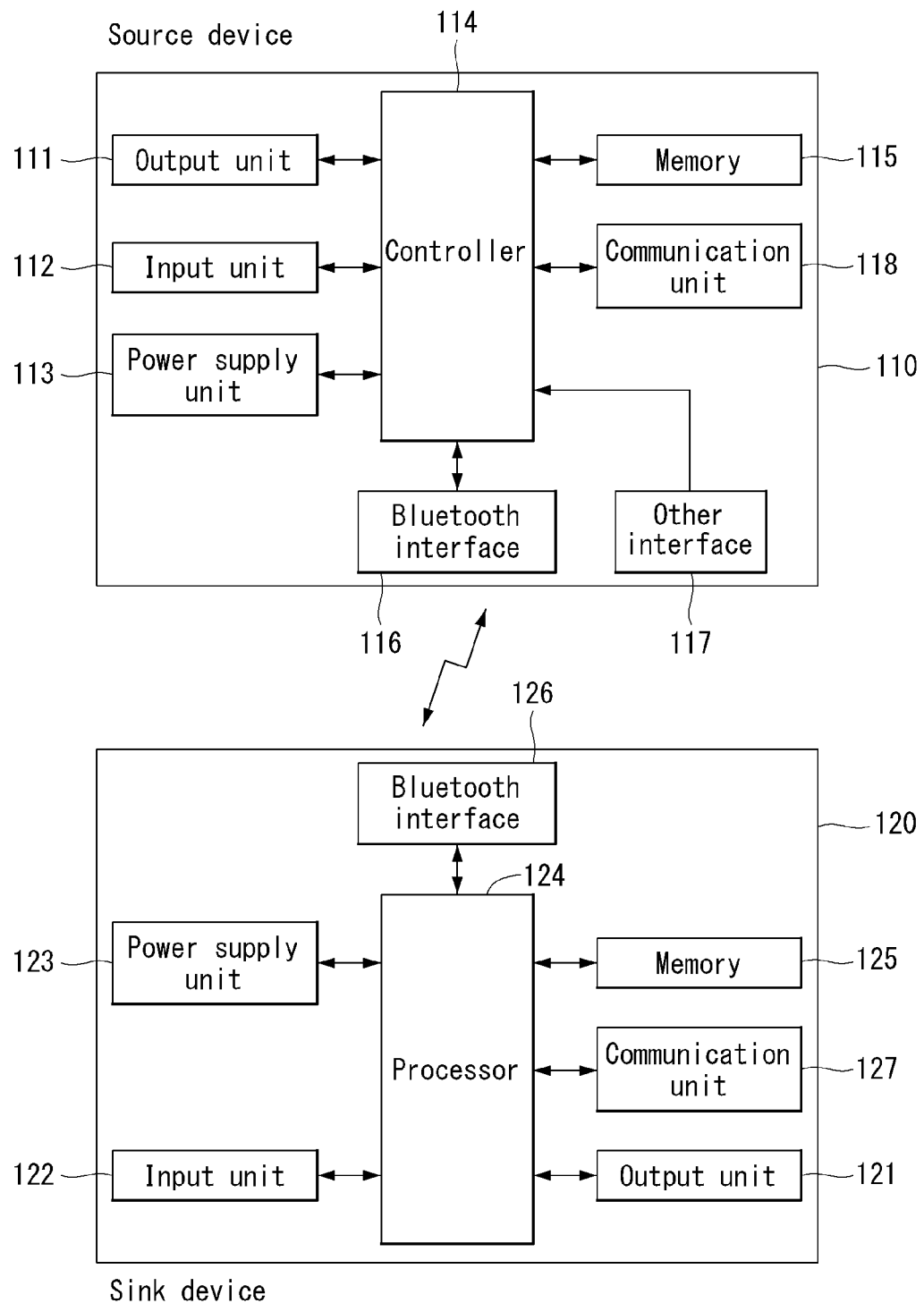

[FIG. 3]
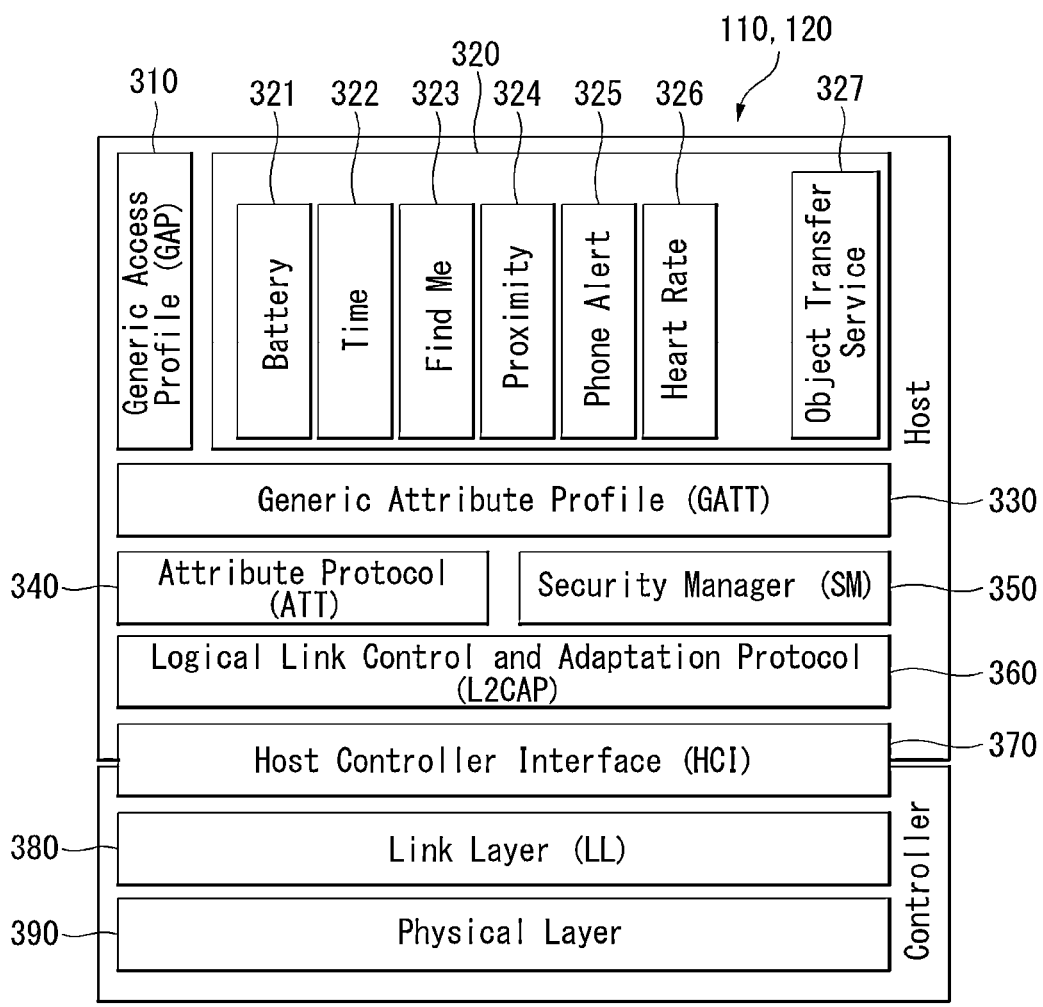

[FIG. 4]
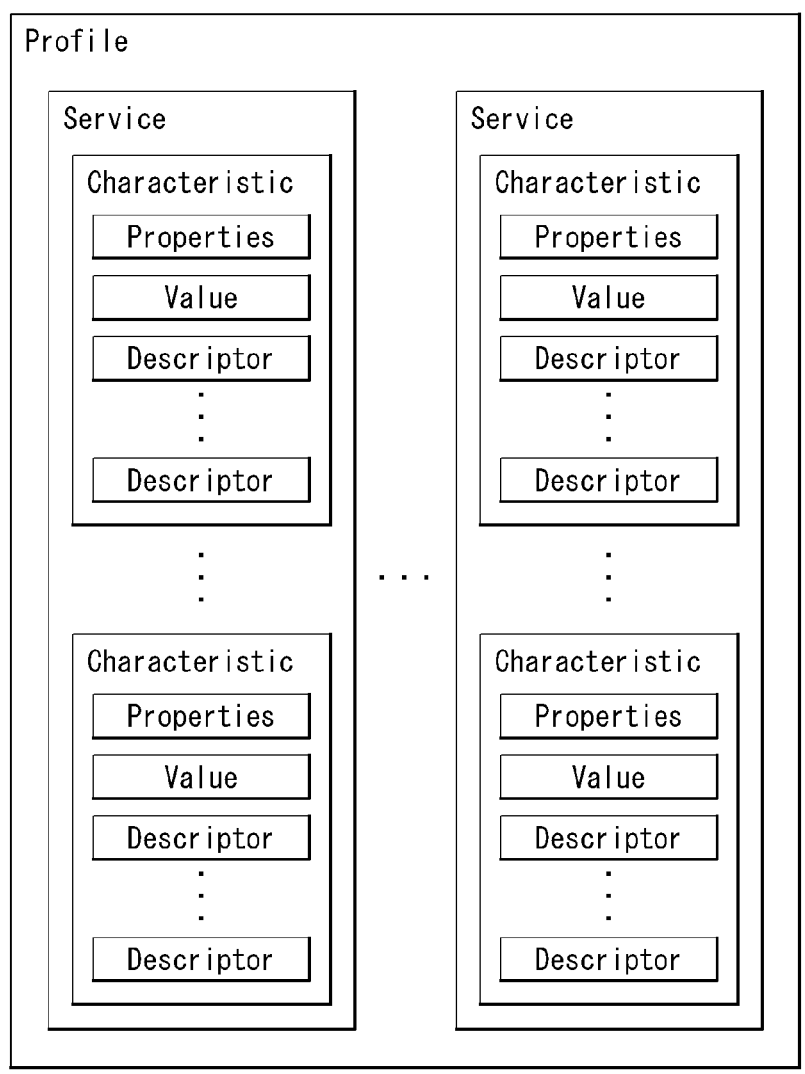

[FIG. 5]
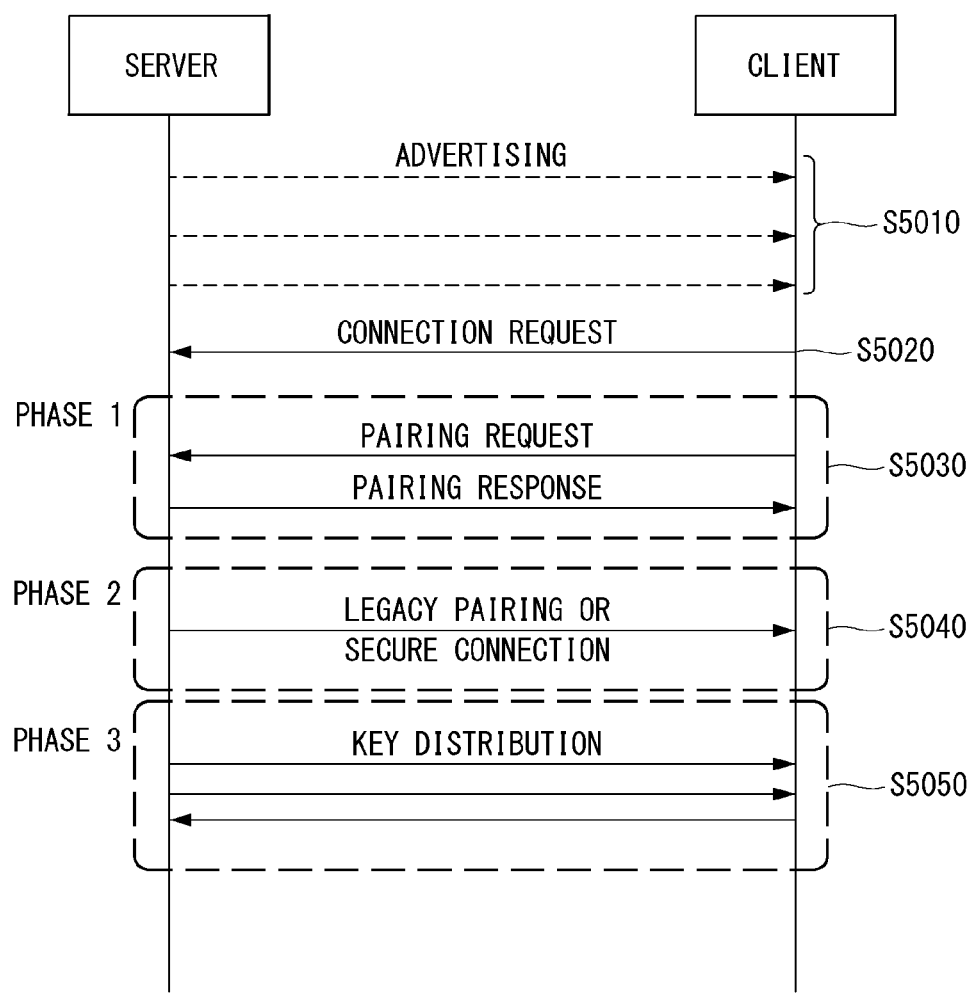

[FIG. 6]
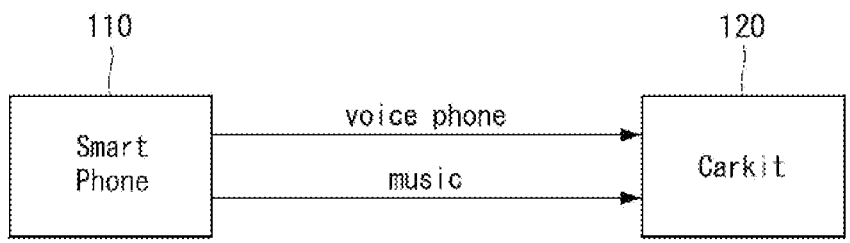
[FIG. 7]
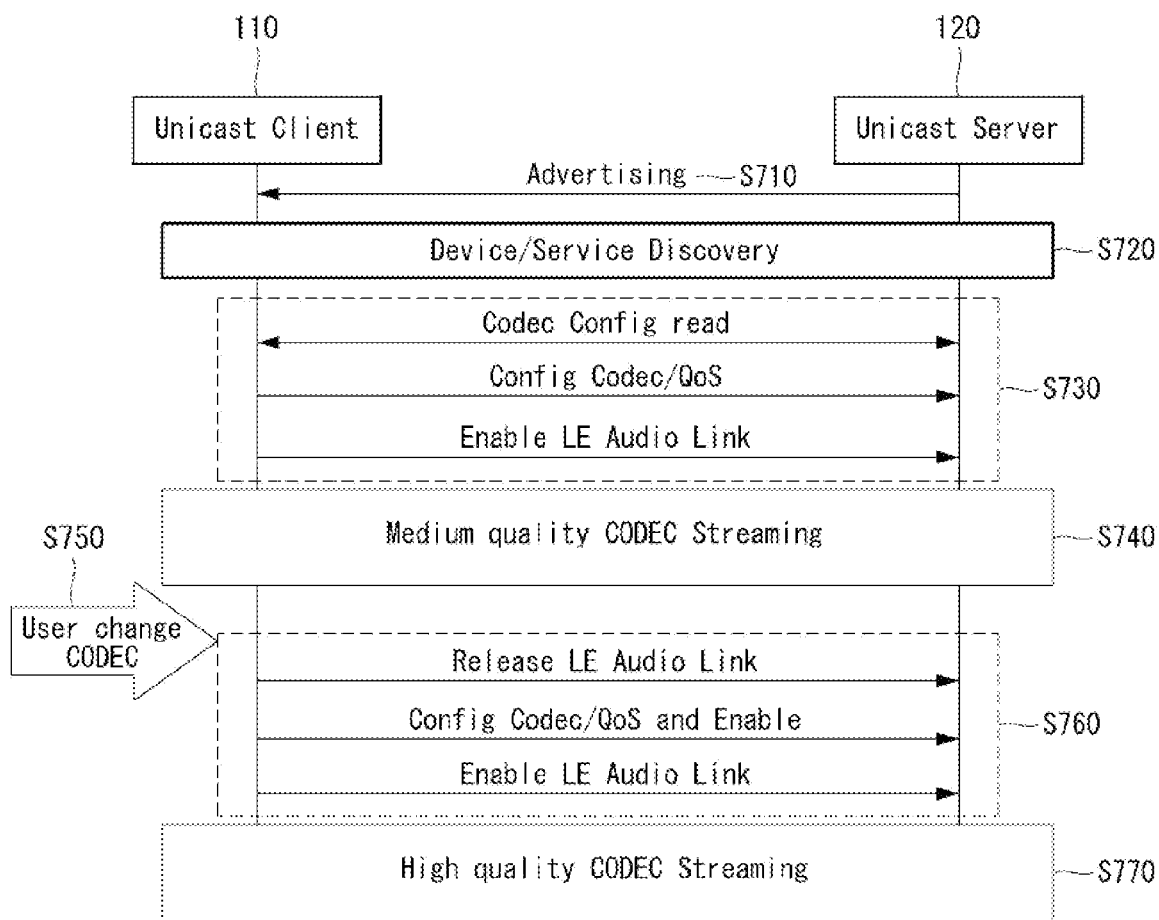

[FIG. 8]
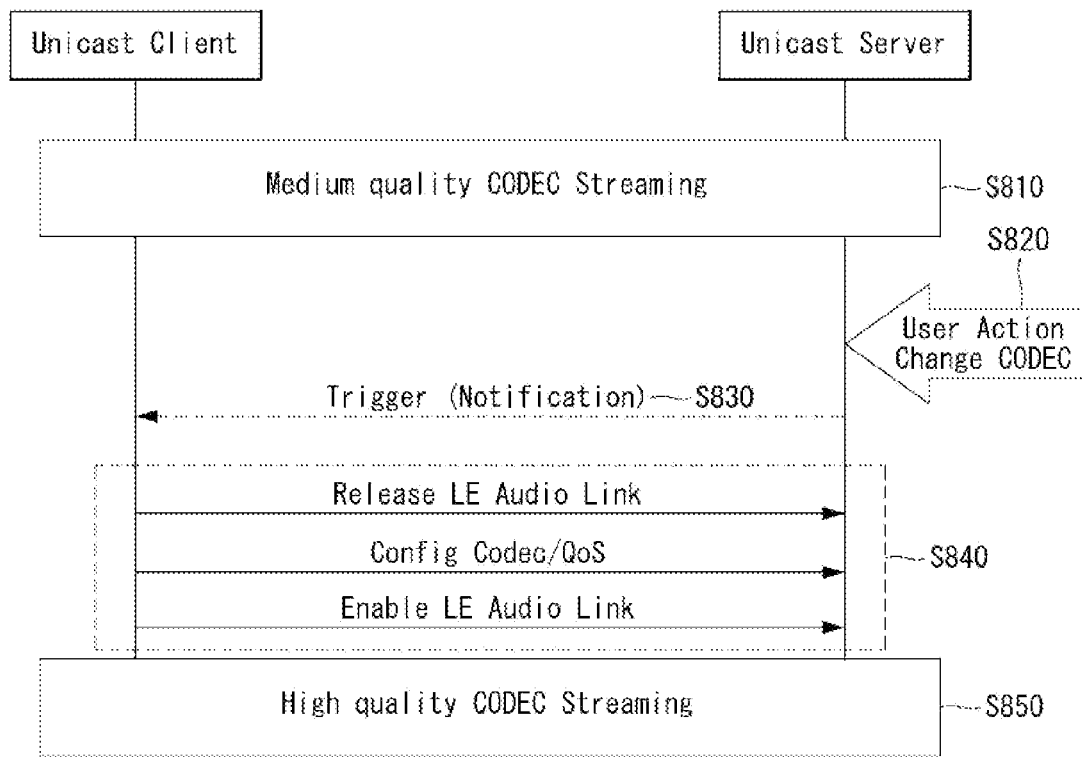
[FIG. 9]

[FIG. 10]
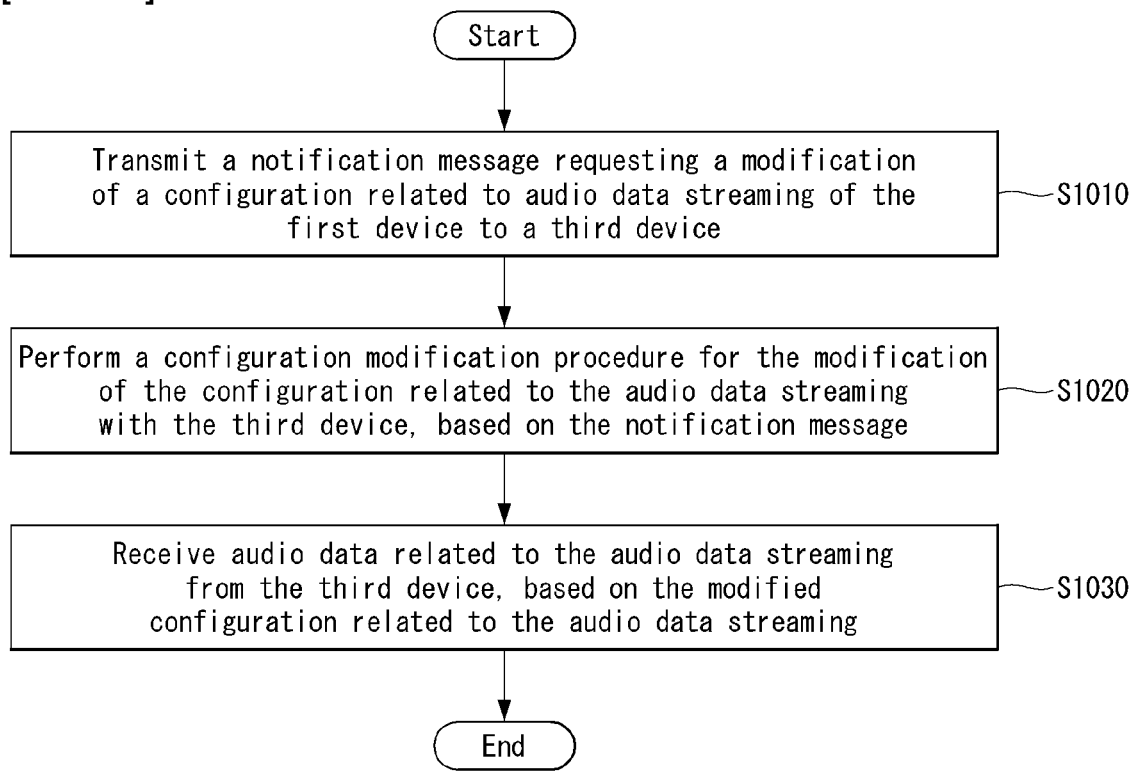

[FIG. 11]
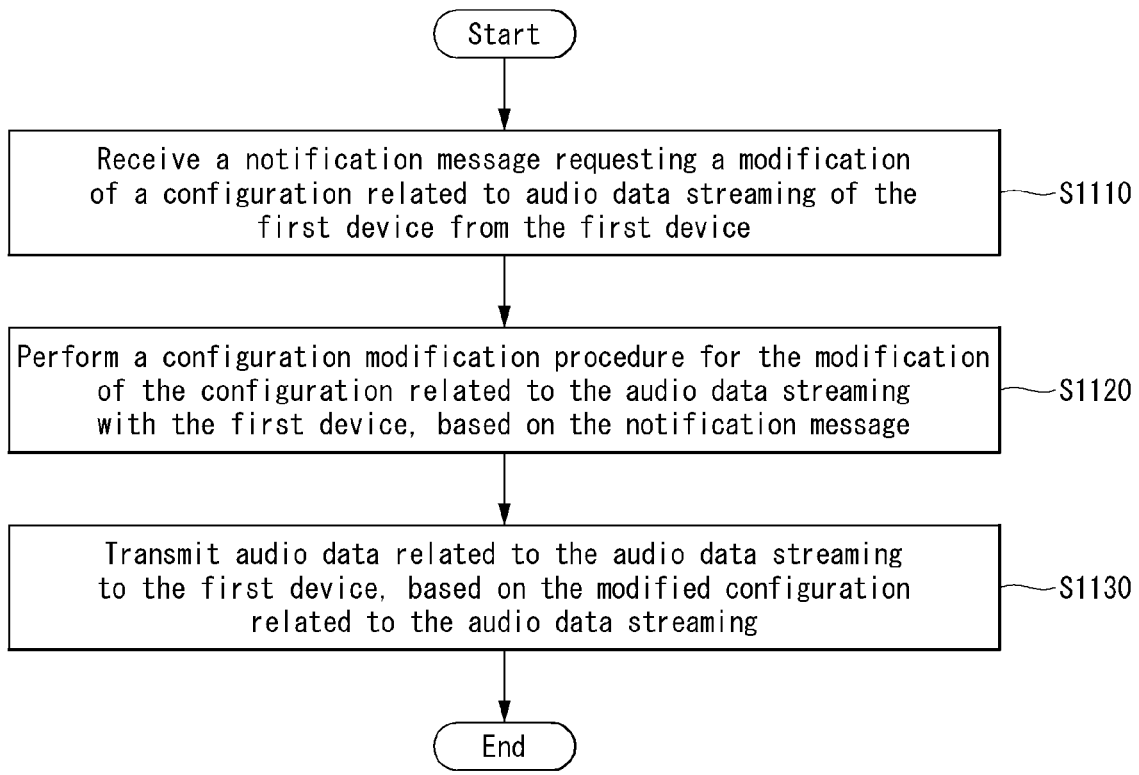

AUDIO DATA RECEPTION METHOD USING SHORT-RANGE WIRELESS COMMUNICATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2021/001714, filed on Feb. 9, 2021, which claims the benefit of earlier filing date and right of priority to Korean Application No. 10-2020-0015867, filed on Feb. 10, 2020, the contents of which are all incorporated by reference herein in their entirety.

TECHNICAL FIELD

The present disclosure relates to a wireless communication system, and more particularly, to a method and an apparatus for receiving audio data using short-range wireless communication.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The technical object of the present disclosure is to provide a method and apparatus for receiving audio data using a short-range wireless communication performed by a first device.

In addition, the technical object of the present disclosure is to provide a method and apparatus for modifying a configuration for audio data streaming performed by a first device.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method of receiving, by a first device, audio data in a short range wireless communication system, and device therefor.

Specifically, a method of receiving audio data, by a first device, in a short-range wireless communication system, the method comprising: transmitting, to a third device, a notification message requesting a modification of a configuration related to audio data streaming of the first device, wherein the notification message includes configuration modification information for the modification of the configuration related to the audio data streaming; performing, with the third device, a configuration modification procedure for the modification of the configuration related to the audio data streaming, based on the notification message; and receiving, from the third device, audio data related to the audio data streaming, based on the modified configuration related to the audio data streaming, wherein the configuration modification procedure is initiated based on the notification message, and the configuration related to the audio data streaming is modified Furthermore, in the present disclosure, wherein the configuration modification information includes codec type information related to a type of codec for decoding the audio data.

Furthermore, in the present disclosure, wherein the configuration modification information identification information for a specific connection, among one or more connections established between the first device and the third device, to which at least one information included in the configuration modification information is applied, and wherein the configuration related to the audio data streaming which is applied to the specific connection is modified based on the identification information.

Furthermore, in the present disclosure, wherein the audio data includes audio data type information on a type of the audio data.

Furthermore, in the present disclosure, generating, based on the audio data type information, mapping information related to a mapping relation between the codec type information related to the type of the codec for decoding the audio data and the audio data type information; and storing the mapping information.

Furthermore, in the present disclosure, further comprising: receiving another audio data, wherein the another audio data includes audio data type information on a type of the another audio data; and determining the type of the another audio data based on the audio data type information of the another audio data.

Furthermore, in the present disclosure, wherein based on the determined type of the another audio data is one of types of audio data included in the mapping information: wherein the notification message is transmitted without a user input related to the modification of the configuration related to the audio data streaming, wherein codec type information for decoding the another audio data is determined based on the mapping information.

Furthermore, in the present disclosure, wherein based on the determined type of the another audio data is not matched with any one of the types of audio data included in the mapping information, further comprising: obtaining the user input, wherein the user input is for selecting one codec among types of codec supported by the first device, wherein the notification message is transmitted based on the user input.

Furthermore, in the present disclosure, wherein the audio data further includes play time information related to a time when the audio data is played.

Furthermore, in the present disclosure, further comprising: generating, based on the play time information, duration time information related to duration time when the modified configuration related to the audio data streaming maintains, wherein the duration time information is transmitted to the third device by being included in the configuration modification information.

Furthermore, in the present disclosure, re-performing a configuration modification procedure for reconfiguring the modified configuration related to the audio data streaming to a configuration before a modification, wherein the re-performed configuration modification procedure is performed at a time which the duration time information represents, without a transmission of the notification message.

Furthermore, in the present disclosure, wherein a re-performance of the re-performed configuration modification procedure, the configuration related to the audio data streaming before the modification is applied to a connection, for the audio data streaming, between the first device and the third device.

Furthermore, in the present disclosure, wherein the configuration modification information is transmitted by being included in a metadata field included in a sink PAC (Published Audio Capability) characteristic.

Furthermore, in the present disclosure, further comprising: transmitting, to the third device, a advertising message related to the audio data streaming; receiving, from the third device, a first read request message requesting capability information of the first device related to the audio data streaming; transmitting, to the third device, a read response massage including the capability information in response to the first read request message; receiving, from the third device, a message for an initial configuration for the audio data streaming; and establishing, with the third device, a connection for the audio data streaming, wherein the audio data related to the audio data streaming is transmitted and received via the connection.

Furthermore, in the present disclosure, further comprising: wherein performing, with the third device, the configuration modification procedure comprises: receiving, from the third device, a message requesting a release for the connection; receiving, from the third device, a message for modification of the configuration related to the audio data streaming; and re-establishing the connection with the third device, based on the message, wherein the modified configuration related to the audio data streaming is applied to the connection.

Furthermore, in the present disclosure, a method of transmitting audio data, by a third device, in a short-range wireless communication system, the method comprising: receiving, from a first device, a notification message requesting a modification of a configuration related to audio data streaming of the first device, wherein the notification message includes configuration modification information for the modification of the configuration related to the audio data streaming; performing, with the first device, a configuration modification procedure for the modification of the configuration related to the audio data streaming, based on the notification message; and transmitting, to the first device, audio data related to the audio data streaming, based on the modified configuration related to the audio data streaming, wherein the configuration modification procedure is initiated based on the notification message, and the configuration related to the audio data streaming is modified based on the configuration modification information.

Furthermore, in the present disclosure, a first device of receiving audio data in a short-range wireless communication system, the first device comprising: a transmitter for transmitting a radio signal; a receiver for receiving a radio signal; and a processor operatively connected to the transmitter and the receiver; wherein the processor is configured to control: the transceiver to transmit, to a third device, a notification message requesting a modification of a configuration related to audio data streaming of the first device, wherein the notification message includes configuration modification information for the modification of the configuration related to the audio data streaming; to perform, with the third device, a configuration modification procedure for the modification of the configuration related to the audio data streaming, based on the notification message; and the receiver to receive, from the third device, audio data related to the audio data streaming, based on the modified configuration related to the audio data streaming, wherein the configuration modification procedure is initiated based on the notification message, and the configuration related to the audio data streaming is modified based on the configuration modification information.

Furthermore, in the present disclosure, a third device of transmitting audio data in a short-range wireless communication system, the first device comprising: a transmitter for transmitting a radio signal; a receiver for receiving a radio signal; and a processor operatively connected to the transmitter and the receiver; wherein the processor is configured to control: the receiver to receive, from a first device, a notification message requesting a modification of a configuration related to audio data streaming of the first device, wherein the notification message includes configuration modification information for the modification of the configuration related to the audio data streaming; to perform, with the first device, a configuration modification procedure for the modification of the configuration related to the audio data streaming, based on the notification message; and the transmitter to transmit, to the first device, audio data related to the audio data streaming, based on the modified configuration related to the audio data streaming, wherein the configuration modification procedure is initiated based on the notification message, and the configuration related to the audio data streaming is modified based on the configuration modification information.

Advantageous Effects

In accordance with the embodiment of the present disclosure, there is an effect that a first device may receive audio data using a short-range wireless communication.

In addition, there is an effect that a first device may modify a configuration for audio data streaming.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present disclosure, provide embodiments of the present disclosure, and together with the detailed description, describe the technical features of the present disclosure.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 is a diagram illustrating an example of a user scenario to which a method proposed by the present disclosure may be applied.

FIG. 7 is a diagram illustrating an example of an operation of modifying a configuration related to audio data streaming of a first device.

FIG. 8 is a diagram illustrating an example of an operation of modifying a configuration related to audio data streaming of a first device.

FIG. 9 is a diagram illustrating another example of an operation of modifying a configuration related to audio data streaming of a first device.

FIG. 10 is a flowchart illustrating an example of an operation for performing a method for receiving audio data by a first device in a wireless communication system proposed in the present disclosure, which is implemented in the first device.

FIG. 11 is a flowchart illustrating an example of an operation for performing a method for transmitting audio data by a third device in a wireless communication system proposed in the present disclosure, which is implemented in the third device.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.
② Include: Define a relationship between services.
③ Characteristics: A data value used by a service
④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.
Time: A method for exchanging time information.
FindMe: A method for providing an alarm service according to the distance.
Proximity: A method for exchanging battery information.
Time: A method for exchanging time information The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scan Window" duration. scanInterval is defined as the interval between the start points of two consecutive scan windows.

If there is no scheduling collision, the link layer has to perform listening in order to complete all of the scanIntervals of scan Windows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scan Window" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |

TABLE 1-continued

| PDU Type | Packet Name |
| --- | --- |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.
 handle: Address of attribute
 Type: Type of attribute
 Value: Value of attribute
 Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.
 Temporary Key: Key made for creating the STK
 Short Term Key (LTK): Key value used for making encrypted connection between devices When the secure connection is performed in Phase 2, a 128-bit long term key (LTK) is generated.
 Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Hereinafter, a method of receiving audio data using short-range wireless communication in a wireless communication system will be described in detail. [Table 9]

In the present disclosure, the device that transmits audio data may be represented by a third device, a control device, a source device, a client device, and the like, and may be expressed variously within the same or similar interpretation scope. Furthermore, the device that receives and outputs the audio data may be expressed as a first device, a second device, a sink device, a server device, and the like, and may be expressed variously within the same or similar interpretation scope.

In the present disclosure, a source device may transmit audio data to a sink device by using the unicast scheme or the broadcast scheme (i.e., the source device may provide an audio data streaming service).

The present disclosure proposes a method of modifying a configuration/setting of the first device 120 for audio data streaming through a first device user interface (UI) configuration menu, and the like. More specifically, the method proposed in the present disclosure relates to a method for modifying a configuration/setting of the first device 120 for audio data streaming performed by the first device 120.

According to the LE Audio standard, only the client device of a smartphone may configure/modify the audio data streaming related setting of a server device. The server device may configure/modify the audio data streaming related setting.

Meanwhile, while a user driving a car is enjoying music using a server device (e.g., Carkit) connected with a client device (e.g., a smartphone)), the music that the user desires to listen with high sound quality. In this case, the user may want to modify the codec used for audio data decoding of the server device to the codec used for high sound quality music listening. Generally, since the client device of a smartphone establishes a connection automatically with a server device, the user stores the client device such as a smartphone in a storage space such as a pocket/handbag of the user. In such a case, if the user may modify the codec of the server device (Carkit) without any separate manipulation of the client device such as a smartphone, the user convenience may be increased. For this, it is required to be implemented that the audio data streaming related setting of the server device may be configured/modified even by the server device. In order for the server device to configure/modify the audio data streaming related setting, the present disclosure proposes the scheme in which, when a user inputs a user input by the server device, the server sends a trigger to the client device for the configuration modification, and the configuration is modified to a modification configuration such as a high quality codec based on the trigger in the existing configuration such as a low quality codec. Furthermore, the configuration may also be modified to a modification configuration such as a low quality codec in the existing configuration such as a high quality codec.

For the convenience of description, hereinafter, the device that transmits audio data is commonly called a third device, and the device that receives audio data is commonly called a first device.

FIG. 6 is a diagram illustrating an example of a user scenario to which the method proposed in the present disclosure is applicable.

In FIG. 6, a user is on a car, and a connection is established between a smartphone 110 of the user and a Carkit 120 mounted on the car. The Carkit may be a device mounted on the car, which is connected to the smartphone and may provide audio data streaming, voice call function, and the like. Here, the smartphone may be the third device, and the Carkit may be the first device.

More specifically, in FIG. 6, when the user is on the car, the smartphone is connected to the Carkit. In addition, generally, two logical LE connections may be established between the smartphone and the Carkit. In this case, one connection (first connection) may be designed for a voice call, and another connection (second connection) is designed for audio data streaming.

In the case that the user uses the audio data streaming to listen to music through the second connection), depending on a sort of music (e.g., the genre of music) that the user is listening to, the user may want to modify a configuration of the Carkit for the audio data streaming. For example, when the audio data related to a specific type of music is playing, the user may want the audio data to be played with high quality. Particularly, the user may modify a configuration of a codec for audio data decoding of the Carkit such that the audio data is played with high quality. In this case, according to the method proposed in the present disclosure, the user may modify the configuration of a codec for audio data decoding through the Carkit (server device) without any separate manipulation through the smartphone.

As another example of a user scenario to which the method proposed in the present disclosure is applicable, there may be a case that several users use a group call through a single Carkit. More specifically, a client device of the user driving a car establishes a connection with a server device mounted in the car, and the client device of the user may be connected to an external device based on a specific wireless communication technology and uses a voice call service. The specific wireless communication technology may be long term evolution (LTE), new radio (NR), and the like. In this case, in the voice call service between the user driving the car and the user of the external device, the other users on the car may participate through a group call. In this case, in order for the other users to participate in the group call, each of the devices of the other users may establish a connection with the client device of the user driving the car. In the aspect of Bluetooth hand free profile, the client device of the user driving the car may correspond to "Audio Gateway Carkit" and the devices of the other users may correspond to "Hands Free". In this case, due to the restrictions such as a bandwidth, a codec configuration for the voice call service is required to be modified, and in this case, according to the method proposed in the present disclosure, the user may modify the codec configuration for the voice call service through the Carkit (server device) without any separate manipulation through the user's smartphone. The method proposed in the present disclosure may be preferably applied to such user scenarios.

FIG. 7 is a diagram illustrating an example of an operation of modifying a configuration related to audio data streaming of a first device.

More specifically, FIG. 7 relates to an operation of modifying a configuration related to audio data streaming of the first device 120 by the third device 110.

S710: First, the first device 120 transmits an advertisement message related to audio data streaming to the third device 110.

S720: Thereafter, the first device 120 and the third device 110 perform a device/service discovery step. After performing the device/service discovery step, a Bluetooth low energy (BLE) connection may be established between the first device 120 and the third device 110.

S730: Next, the first device 120 receives a read request message for requesting capability information of the first device 120 related to the audio data streaming from the third device 110.

Thereafter, in response to the read request message, the first device 120 transmits a read response message including the capability information to the third device 110. The third device 110 may identify the capability of the first device 120 related to the audio data streaming based on the read response message. Table 2 below represents an example of the information of the capability of transmission by the first device 120.

As represented in Table 2 below, the capability information may include information for a type of codec which is supported in the first device, and the codec Codec_id[0] may be set as default among the codecs supported in the first device.

TABLE 2

| | |
|---|---|
| Codec_id[0] | LC3-24 khz, 16bit |
| Codec_id[1] | LC3-48 khz, 16bit |
| Codec_id[2] | LC3-16 khz, 16bit |
| Codec_id[3] | APTX-HD-48 khz, 24bit |
| Metadata | Default: 0 |

Thereafter, the first device 120 receives a message for setting an initial configuration for the audio data streaming from the third device 110.

Next, the first device 120 establishes a connection for the audio data streaming with the third device 110.

In step S730, the operation that the first device 120 is requested to transmit the capability information from the third device 110 and transmit the capability information to the third device 110 may be performed by using published audio capability (PAC) characteristics.

Before step S730, if there has been a case that a connection between the first device 120 and the third device 110 is already established, the operation that the first device 120 is requested to transmit the capability information from the third device 110 and transmit the capability information to the third device 110 may be omitted.

S740: Thereafter, the first device 120 and the third device 110 transmit and receive audio data through the connection for the audio data streaming which is established in step S730. In step S740, for the convenience of description, the case is described that the audio data streaming is performed by using a codec of middle quality.

S750: Later, in the case that a user wants to modify a codec configuration for audio data decoding of the first device 120, the third device 110 obtains a user input for requesting a modification of the codec configuration. More specifically, the third device 110 may output information for codec configurations supported by the first device 120 on a display, and the user may select one of the information for the codec configurations output on the display.

S760: Based on the user input, the third device 110 performs a procedure for releasing the connection for the audio data streaming with the first device 120. More specifically, the third device 110 may receive a message for requesting to release the connection from the third device 110.

Thereafter, the first device 120 receives a message including information for a modification of the configuration for the audio data streaming of the first device from the third device 110. The information for a modification of the configuration for the audio data streaming may be determined based on the user input.

Later, the first device 120 reestablishes a connection for the audio data streaming with the third device 110. The modified configuration related to the audio data streaming may be applied to the reestablished connection. More specifically, based on the operations, the configuration for the audio data streaming of the first device 120 may be modified such that a codec of high quality is used.

S770: Lastly, the first device 120 and the third device 110 transmit and receive audio data through the reestablished connection for the audio data streaming.

FIG. 8 is a diagram illustrating an example of an operation of modifying a configuration related to audio data streaming of a first device.

More specifically, FIG. 8 relates to an operation of modifying a configuration related to audio data streaming of the first device 120 by the third device 110. The operation between the first device 120 and the third device 110 may be the operation performed after the operations of FIG. 710 to FIG. 730 shown in FIG. 7 are performed.

S810: The first device 120 and the third device 110 transmit and receive audio data through a connection for audio data streaming. In step S810, for the convenience of description, the case is described that the audio data streaming is performed by using a codec of middle quality.

S820: Next, the first device 120 obtains a user input related to a modification of a configuration related to the audio data streaming of the first device 120. More specifically, the first device 120 may output information for codec configurations supported by the first device 120 on a display to a user, and the user may select one of the information for the codec configurations output on the display. To perform the operation, the first device 120 may be a device on which a user interface (UI) to obtain the display and the user input is mounted. In addition, even in the case that a user interface (UI) to obtain the display and the user input is not mounted in the first device 120, a device such as a headset, an earbud, and the like, which are available for voice recognition may obtain the user input related to a modification of a configuration related to the audio data streaming through in input of voice of the user.

S830: Thereafter, based on the user input, the first device 120 transmits a notification message for requesting a modification of the configuration related to the audio data streaming of the first device 120. The notification message may be transmitted without a read request message from the third device 110. A notification property may be additionally defined in the sink published audio capability characteristics (PAC) of the first device 120.

Here, the notification message includes configuration modification information for modifying the configuration related to the audio data streaming. More specifically, the configuration modification information may include codec type information related to a type of a codec for decoding the audio data. Table 3 below represents an example of the configuration modification information.

TABLE 3

| | |
|---|---|
| Codec_id[0] | LC3-24 khz, 16bit |
| Codec_id[1] | LC3-48 khz, 16bit |
| Codec_id[2] | LC3-16 khz, 16bit |
| Codec_id[3] | APTX-HD-48 khz, 24bit |
| Metadata | Change: codec_id[3] Related Logical connection: ## |

As represented in Table 3 above, the configuration modification information may be included in metadata field included in the sink PAC property of the first device 120 and transmitted.

Furthermore, the configuration modification information may further include identification information for a specific connection, among one or more connections established between the first device and the third device, to which at least one information included in the configuration modification information is applied. In this case, the configuration related to the audio data streaming which is applied to the specific connection may be modified based on the identification information.

S840: Next, the first device 120 performs a configuration modification procedure for the modification of the configuration related to the audio data streaming. The modification procedure is initiated based on the notification message.

More specifically, the third device 110 performs a procedure for releasing the connection for the audio data streaming with the third device 110. That is, the third device 110 may receive a message for requesting to release the connection from the third device 110.

Thereafter, the first device 120 receives a message including information for a modification of the configuration for the audio data streaming of the first device 120 from the third device 110. The information for a modification of the configuration for the audio data streaming may be determined based on the configuration modification information.

Later, the first device 120 reestablishes a connection for the audio data streaming with the third device 110. The modified configuration related to the audio data streaming may be applied to the reestablished connection. That is, the configuration related to the audio data streaming may be modified based on the configuration modification information. More specifically, based on the operations, the configuration for the audio data streaming of the first device 120 may be modified such that a codec of high quality is used.

S850: Thereafter, the first device 120 receives audio data related to the audio data streaming based on the modified configuration related to the audio data streaming from the third device 110.

Additionally, additional information in addition to the data for an audio streaming service may be included in the audio data transmitted by the third device 110.

In one example, audio data type information for a type of the audio data may be further included. The audio data type information may be file name information of the audio data, information for the genre of music of the audio data, and the like. The first device 120 may determine a type of the audio data based on the audio data type information.

In addition, the first device 120 may generate mapping information related to a mapping relation between the codec type information related to the type of the codec for decoding the audio data and the audio data type information. Furthermore, the first device 120 may store the mapping information. More specifically, (1) in the case that the user modifies a type of codec to be used for decoding audio data, the mapping information between the codec type information related to the type of the modified codec and the audio data type information is generated, and (2) in the case that the user does not modify a type of codec to be used for decoding audio data, the mapping information between the codec type information related to the type of the codec, which is not modified, and the audio data type information is generated. The mapping information may be configured as represented in Table 4 below.

TABLE 4

| Audio data type 1 | Codec_id[0] |
|---|---|
| Audio data type 2 | Codec_id[2] |
| Audio data type 3 | Codec_id[1] |
| Audio data type 4 | Codec_id[3] |

In the case that the first device 120 that stores the mapping information receives audio data including the audio data type information, the first device 120 determines a type of the audio data based on the audio data type information and determines whether the determined type of the audio data is one of the types of audio data included in the mapping information.

In the case that the determined type of the audio data is one of the types of audio data included in the mapping information, the first device 120 may transmit a notification message for requesting to modify the configuration of the first device 120 to the third device 110 without a user input related to the modification of the configuration of the first device for the audio data streaming from the user. In this case, the codec type information included in the notification message may be determined based on the mapping information. More specifically, in describing the example represented in Table 4 above, in the case that the determined audio data type is audio data type 2, the codec type information of the configuration modification information included in the notification message may indicate Codec_id [2]. Furthermore, the first device 120 may recommend an optimal codec for decoding the audio data to the user based on the mapping information. That is, the first device 120 may output a screen for obtaining a user input to the user, but may output the screen with a mark of a specific type of codec which is determined to be the most proper to decoding of the audio data based on the mapping information.

On the other hand, in the case that the determined type of the audio data does not coincide with any one of the types of audio data included in the mapping information, the first device 120 may obtain a user input related to a configuration modification of the first device 120 for audio streaming. The user input is designed to select a codec among the codecs supported in the first device 120, and the notification message may be transmitted based on the user input. More specifically, in describing the example represented in Table 4 above, in the case that the determined audio data type is audio data type 5, the mapping information does not include information for the case of audio data type 5, the first device 120 needs to obtain a user input related to a configuration modification.

As such, based on the mapping information, when the determined audio data type is the audio data type included in the mapping information, the audio streaming related configuration modification procedure may be performed quickly without any separate user input, and fast audio streaming related configuration modification may be available.

Furthermore, in addition to the audio data type information, the audio data may further include play time information related to a time when the audio data is played.

The first device 120 may generating, based on the play time information, duration time information related to a duration time when the modified configuration related to the audio data streaming maintains. The first device 120 may transmit the duration time information to the third device 110 by being included in the configuration modification information.

The first device 120 may perform a configuration modification procedure for reconfiguring the modified configuration related to the audio data streaming to a configuration before a modification again, based on the duration time information. The configuration modification procedure which is re-perform may be performed at a time which the duration time information represents, without a transmission of the notification message. Based on the re-performance of the re-performed configuration modification procedure, the configuration related to the audio data streaming before the modification is applied to a connection, for the audio data streaming, between the first device 120 and the third device 110. In this case, the configuration modification procedure to return to the configuration before a modification may be performed without a separate user input and a transmission of the notification message by the first device 120, and the overhead required to transmit the message for the configuration modification may be reduced, and accordingly, the configuration modification procedure may be performed quickly.

FIG. 9 is a diagram illustrating another example of an operation of modifying a configuration related to audio data streaming of a first device.

In FIG. 9, the first device 120 obtains a user input for modifying a codec from a user. The operation may correspond to step S820 described as shown in FIG. 8 above. Thereafter, the first device 120 may transmit a notification message for requesting a configuration modification to the third device 110 based on the user input. Later, a configuration related to audio data streaming of the first device 120 may be modified, and the first device 120 may perform the audio data streaming based on the modified configuration.

FIG. 10 is a flowchart illustrating an example of an operation for performing a method for receiving audio data by a first device in a wireless communication system proposed in the present disclosure, which is implemented in the first device.

First, the first device 120 transmits a notification message requesting a modification of a configuration related to audio data streaming of the first device to a third device 110 (step S1010).

Here, the notification message includes configuration modification information for the modification of the configuration related to the audio data streaming.

Thereafter, the first device 120 performs a configuration modification procedure for the modification of the configuration related to the audio data streaming with the third device 110, based on the notification message.

Later, the first device 120 receives audio data related to the audio data streaming from the third device 110, based on the modified configuration related to the audio data streaming.

In this case, the configuration modification procedure is initiated based on the notification message, and the configuration related to the audio data streaming is modified based on the configuration modification information.

FIG. 11 is a flowchart illustrating an example of an operation for performing a method for transmitting audio data by a third device in a wireless communication system proposed in the present disclosure, which is implemented in the third device.

First, the third device 110 receives a notification message requesting a modification of a configuration related to audio data streaming of the first device 120 from the first device (step S1110).

Here, the notification message includes configuration modification information for the modification of the configuration related to the audio data streaming.

Thereafter, the third device 110 performs a configuration modification procedure for the modification of the configuration related to the audio data streaming with the first device 120, based on the notification message.

Next, the third device 110 transmits audio data related to the audio data streaming to the first device 120, based on the modified configuration related to the audio data streaming.

In this case, the configuration modification procedure is initiated based on the notification message, and the configuration related to the audio data streaming is modified based on the configuration modification information.

Each of the first device 120 shown in FIG. 10 and the third device 110 shown in FIG. 11 includes a transmitter for transmitting a radio signal; a receiver for receiving a radio signal; and a processor operatively connected to the transmitter and the receiver. Here, the processor may control the transmitter and the receiver to perform the operations described in FIG. 10 and FIG. 11.

It is apparent to those skilled in the art that the present disclosure can be embodied in other specific forms without departing from the essential characteristics of the present disclosure. Accordingly, the foregoing detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product disclosures and process disclosures, description of both disclosures may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

The invention claimed is:

1. A method of receiving audio data, by a first device, in a short-range wireless communication system, the method comprising:
  transmitting, to a third device, a notification message requesting a modification of a configuration related to audio data streaming of the first device,
  wherein the notification message includes configuration modification information for the modification of the configuration related to the audio data streaming;
  performing, with the third device, a configuration modification procedure for the modification of the configuration related to the audio data streaming, based on the notification message,
  wherein the configuration modification procedure is initiated based on the notification message, and the configuration related to the audio data streaming is modified;

receiving, from the third device, audio data related to the audio data streaming, based on the modification of the configuration related to the audio data streaming, wherein the audio data includes audio data type information on a type of the audio data, and play time information related to a time when the audio data is played; and generating, based on the play time information, duration time information related to duration time when the modification of the configuration related to the audio data streaming maintains, wherein the duration time information is transmitted to the third device by being included in the configuration modification information.

2. The method of claim 1,
wherein the configuration modification information includes codec type information related to a type of codec for decoding the audio data.

3. The method of claim 2,
wherein the configuration modification information includes identification information for a specific connection, among one or more connections established between the first device and the third device, to which at least one information included in the configuration modification information is applied, and
wherein the configuration related to the audio data streaming which is applied to the specific connection is modified based on the identification information.

4. The method of claim 2, further comprising:
generating, based on the audio data type information, mapping information related to a mapping relation between the codec type information related to the type of the codec for decoding the audio data and the audio data type information; and
storing the mapping information.

5. The method of claim 4, further comprising:
receiving another audio data,
wherein the another audio data includes audio data type information on a type of the another audio data; and
determining the type of the another audio data based on the audio data type information of the another audio data.

6. The method of claim 5,
wherein based on the determined type of the another audio data is one of types of audio data included in the mapping information:
wherein the notification message is transmitted without a user input related to the modification of the configuration related to the audio data streaming,
wherein codec type information for decoding the another audio data is determined based on the mapping information.

7. The method of claim 6,
wherein based on the determined type of the another audio data is not matched with any one of the types of audio data included in the mapping information, further comprising:
obtaining the user input,
wherein the user input is for selecting one codec among types of codec supported by the first device,
wherein the notification message is transmitted based on the user input.

8. The method of claim 1,
re-performing a configuration modification procedure for reconfiguring the modification of the configuration related to the audio data streaming to a configuration before a modification, wherein the re-performed configuration modification procedure is performed at a time which the duration time information represents, without a transmission of the notification message.

9. The method of claim 8,
wherein a re-performance of the re-performed configuration modification procedure, the configuration related to the audio data streaming before the modification is applied to a connection, for the audio data streaming, between the first device and the third device.

10. The method of claim 1,
wherein the configuration modification information is transmitted by being included in a metadata field included in a sink PAC (Published Audio Capability) characteristic.

11. The method of claim 1, further comprising:
transmitting, to the third device, an advertising message related to the audio data streaming;
receiving, from the third device, a first read request message requesting capability information of the first device related to the audio data streaming;
transmitting, to the third device, a read response massage including the capability information in response to the first read request message;
receiving, from the third device, a message for an initial configuration for the audio data streaming; and
establishing, with the third device, a connection for the audio data streaming,
wherein the audio data related to the audio data streaming is transmitted and received via the connection.

12. The method of claim 1, further comprising:
wherein performing, with the third device, the configuration modification procedure comprises:
receiving, from the third device, a message requesting a release for a connection;
receiving, from the third device, a message for modification of the configuration related to the audio data streaming; and
re-establishing the connection with the third device, based on the message,
wherein the modification of the configuration related to the audio data streaming is applied to the connection.

13. A method of transmitting audio data, by a third device, in a short-range wireless communication system, the method comprising:
receiving, from a first device, a notification message requesting a modification of a configuration related to audio data streaming of the first device,
wherein the notification message includes configuration modification information for the modification of the configuration related to the audio data streaming;
performing, with the first device, a configuration modification procedure for the modification of the configuration related to the audio data streaming, based on the notification message,
wherein the configuration modification procedure is initiated based on the notification message, and the configuration related to the audio data streaming is modified; and
transmitting, to the first device, audio data related to the audio data streaming, based on the modification of the configuration related to the audio data streaming,
wherein the audio data includes audio data type information on a type of the audio data, and play time information related to a time when the audio data is played, wherein duration time information is received from the first device by being included in the configuration modification information, and wherein the duration time information related to duration time when the modification of the configuration related to the audio data streaming maintains is based on the play time information.

14. A first device of receiving audio data in a short-range wireless communication system, the first device comprising:
a transmitter for transmitting a radio signal;
a receiver for receiving a radio signal; and
a processor operatively connected to the transmitter and the receiver;
wherein the processor is configured to control:
the transmitter to transmit, to a third device, a notification message requesting a modification of a configuration related to audio data streaming of the first device,
wherein the notification message includes configuration modification information for the modification of the configuration related to the audio data streaming;
to perform, with the third device, a configuration modification procedure for the modification of the configuration related to the audio data streaming, based on the notification message,
wherein the configuration modification procedure is initiated based on the notification message, and the configuration related to the audio data streaming is modified;
the receiver to receive, from the third device, audio data related to the audio data streaming, based on the modification of the configuration related to the audio data streaming,
wherein the audio data includes audio data type information on a type of the audio data, and play time information related to a time when the audio data is played; and
to generate, based on the play time information, duration time information related to duration time when the modification of the configuration related to the audio data streaming maintains, wherein the duration time information is transmitted to the third device by being included in the configuration modification information.

15. A third device of transmitting audio data in a short-range wireless communication system, the third device comprising:
a transmitter for transmitting a radio signal;
a receiver for receiving a radio signal; and
a processor operatively connected to the transmitter and the receiver;
wherein the processor is configured to control:
the receiver to receive, from a first device, a notification message requesting a modification of a configuration related to audio data streaming of the first device,
wherein the notification message includes configuration modification information for the modification of the configuration related to the audio data streaming;
to perform, with the first device, a configuration modification procedure for the modification of the configuration related to the audio data streaming, based on the notification message,
wherein the configuration modification procedure is initiated based on the notification message, and the configuration related to the audio data streaming is modified; and
the transmitter to transmit, to the first device, audio data related to the audio data streaming, based on the modification of the configuration related to the audio data streaming,
wherein the audio data includes audio data type information on a type of the audio data, and play time information related to a time when the audio data is played,
wherein duration time information is received from the first device by being included in the configuration modification information, and
wherein the duration time information related to duration time when the modification of the configuration related to the audio data streaming maintains is based on the play time information.

* * * * *